United States Patent
Jang et al.

(10) Patent No.: US 12,463,270 B2
(45) Date of Patent: Nov. 4, 2025

(54) BATTERY MODULE AND BATTERY PACK INCLUDING THE SAME

(71) Applicant: LG Energy Solution, Ltd., Seoul (KR)

(72) Inventors: Sunghwan Jang, Daejeon (KR); Junyeob Seong, Daejeon (KR); Jongpil Jeon, Daejeon (KR); Min Seop Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 955 days.

(21) Appl. No.: 17/615,401

(22) PCT Filed: Mar. 15, 2021

(86) PCT No.: PCT/KR2021/003176
§ 371 (c)(1),
(2) Date: Nov. 30, 2021

(87) PCT Pub. No.: WO2021/221312
PCT Pub. Date: Nov. 4, 2021

(65) Prior Publication Data
US 2022/0231355 A1    Jul. 21, 2022

(30) Foreign Application Priority Data
Apr. 28, 2020   (KR) .................. 10-2020-0051167

(51) Int. Cl.
H01M 10/6556    (2014.01)
H01M 10/613     (2014.01)
H01M 10/647     (2014.01)

(52) U.S. Cl.
CPC ..... *H01M 10/6556* (2015.04); *H01M 10/613* (2015.04); *H01M 10/647* (2015.04)

(58) Field of Classification Search
CPC .......... H01M 10/6556; H01M 10/613; H01M 10/647
(Continued)

(56) References Cited

U.S. PATENT DOCUMENTS 9,638,475 B2    5/2017  Burgers et al.
11,056,735 B2   7/2021  Burgers et al.
(Continued)

FOREIGN PATENT DOCUMENTS

CN    102714337 A    10/2012
CN    108270048 A    7/2018
(Continued)

OTHER PUBLICATIONS

Extended European Search Report including Written Opinion for Application No. 21795902.2 dated Feb. 14, 2023, pp. 1-11.
(Continued)

*Primary Examiner* — Jonathan G Leong
*Assistant Examiner* — John S Medley
(74) *Attorney, Agent, or Firm* — Lerner David LLP (57) ABSTRACT

The battery module according to one embodiment of the present disclosure includes: a battery cell stack in which a plurality of battery cells are stacked; a module frame housing the battery cell stack; and a first heat sink located at an upper part of the module frame, wherein the first heat sink includes an upper plate and a lower plate, wherein a lower plate of the first heat sink constitutes an upper cover of the module frame, and wherein the first heat sink includes a cooling flow passage having at least one partition wall is-formed between the upper plate and the upper cover of the module frame.

15 Claims, 9 Drawing Sheets

(58) Field of Classification Search
USPC .......................................................... 429/120
See application file for complete search history.

(56) References Cited

U.S. PATENT DOCUMENTS

| | | | |
|---|---|---|---|
| 2012/0171532 A1 | 7/2012 | Lee et al. | |
| 2014/0023906 A1* | 1/2014 | Hashimoto | H01M 10/625 |
| | | | 429/157 |
| 2015/0144314 A1* | 5/2015 | Srinivassan | F28F 9/0253 |
| | | | 285/124.5 |
| 2015/0325889 A1 | 11/2015 | Jung et al. | |
| 2016/0087319 A1 | 3/2016 | Roh et al. | |
| 2016/0359211 A1* | 12/2016 | Kenney | H01M 10/6557 |
| 2018/0038039 A1* | 2/2018 | Jang | D06F 37/40 |
| 2018/0048039 A1* | 2/2018 | Newman | H01M 10/625 |
| 2018/0166754 A1 | 6/2018 | Dudley et al. | |
| 2018/0191041 A1 | 7/2018 | Jeon et al. | |
| 2018/0358592 A1* | 12/2018 | Park | C08K 5/49 |
| 2018/0366794 A1 | 12/2018 | Kim et al. | |
| 2019/0109357 A1* | 4/2019 | Kenney | F28F 21/00 |
| 2020/0119416 A1 | 4/2020 | Kim et al. | |
| 2020/0194851 A1 | 6/2020 | Seo et al. | |
| 2021/0249710 A1* | 8/2021 | Kimura | H01M 50/233 |
| 2023/0060247 A1* | 3/2023 | Han | H01M 10/653 |
| 2023/0352766 A1 | 11/2023 | Hwang et al. | |

FOREIGN PATENT DOCUMENTS

| | | | | |
|---|---|---|---|---|
| EP | 2955780 A1 | 12/2015 | | |
| JP | 5993615 B2 | 9/2016 | | |
| JP | 201946748 A | 3/2019 | | |
| JP | 2019516225 A | 6/2019 | | |
| JP | 2019519884 A | 7/2019 | | |
| KR | 20130132459 A | 12/2013 | | |
| KR | 20150045378 A | 4/2015 | | |
| KR | 20160076121 A | 6/2016 | | |
| KR | 20160108960 A | * 9/2016 | | H01M 10/647 |
| KR | 20160117955 A | 10/2016 | | |
| KR | 20170049654 A | 5/2017 | | |
| KR | 20180005456 A | 1/2018 | | |
| KR | 20180034959 A | 4/2018 | | |
| KR | 20180038310 A | 4/2018 | | |
| KR | 2019-0110782 A | 10/2019 | | |
| KR | 2020-0021608 A | 3/2020 | | |
| KR | 20200042341 A | 4/2020 | | |
| WO | 2019182251 A1 | 9/2019 | | |
| WO | 2020027299 A1 | 2/2020 | | |

OTHER PUBLICATIONS

International Search Report for Application No. PCT/KR2021/003176, dated July Jul. 2, 2021, 2 pages.

* cited by examiner

BATTERY MODULE AND BATTERY PACK INCLUDING THE SAME

CROSS-REFERENCE TO RELATED APPLICATION(S)

This application is a national phase entry under 35 U.S.C. § 371 of International Application No. PCT/KR2021/003176, filed Mar. 15, 2021, published in Korean, which claims priority to Korean Patent Application No. 10-2020-0051167, filed on Apr. 28, 2020, the entire contents of which are hereby incorporated herein by reference.

TECHNICAL FIELD

The present disclosure relates to a battery module and a battery pack including the same, and more particularly, to a battery module having improved cooling performance and a battery pack including the same

BACKGROUND ART

As technology development and demands for mobile devices increase, the demand for secondary batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module in which a large number of battery cells are electrically connected is used. Preferably, the middle or large-sized battery module is manufactured so as to have as small a size and weight as possible. For this reason, a prismatic battery, a pouch-type battery or the like, which can be stacked with high integration and has a small weight to capacity ratio, is usually used as a battery cell of the middle or large-sized battery module. Therefore, a middle or large-sized battery module in which a large number of battery cells are electrically connected is used, and there is an increasing need to install more battery cells in the battery module gradually.

Further, when the temperature of the secondary battery is higher than an appropriate temperature, the performance of the secondary battery may be deteriorated, and if it is severe, there is also a risk of an explosion or ignition. In particular, a large number of secondary batteries, that is, a battery module or a battery pack having battery cells, can add up the heat generated from the large number of battery cells in a narrow space, so that the temperature can rise more quickly and severely. In the case of a battery module in which a large number of battery cells are stacked and a battery pack equipped with such a battery module, high output can be obtained, but it is not easy to remove heat generated from the battery cells in charging and discharging operations. When the heat dissipation of the battery cell is not properly performed, deterioration of the battery cells is accelerated, the lifespan is shortened, and the possibility of explosion or ignition increases.

Moreover, in the case of a middle or large-sized battery module included in a vehicle battery pack, it is frequently exposed to direct sunlight and can be subjected to high temperature conditions such as summer or desert areas.

In addition, as the necessity for battery modules to include more battery cells increases, it is considered very important to ensure stable and effective cooling performance in relation to the heat dissipation of the battery module.

Figure 1:
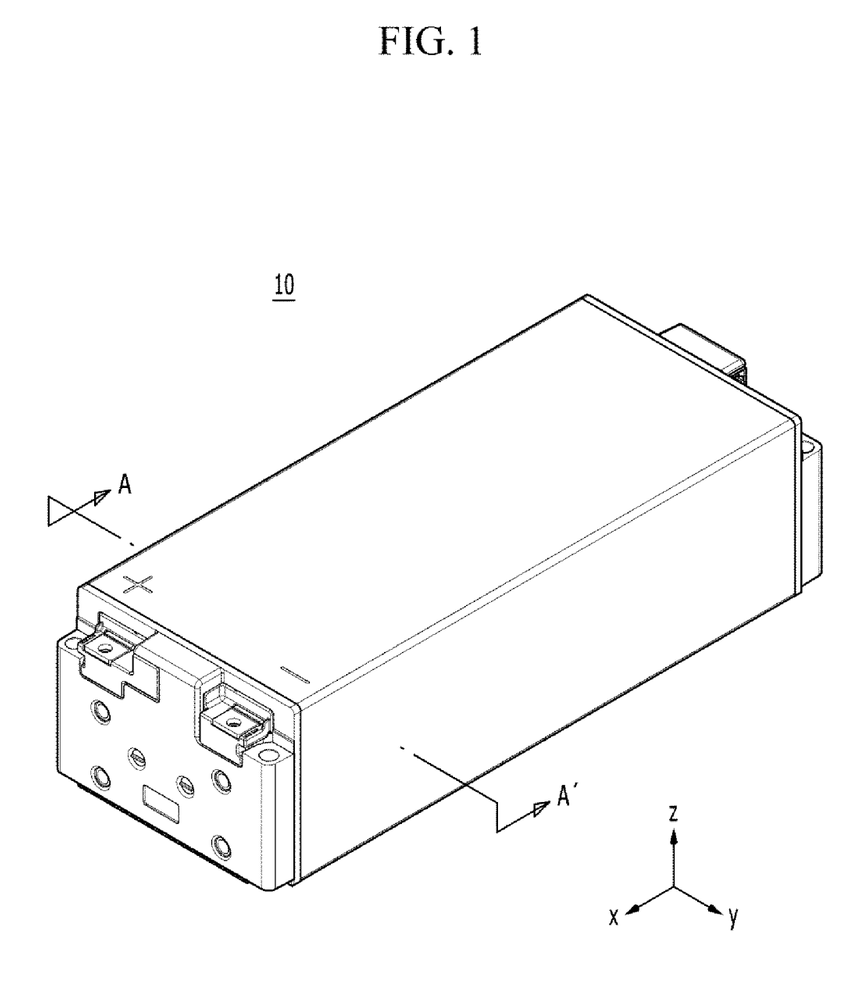
FIG. 1 is a perspective view of a conventional battery module.
Figure 2:
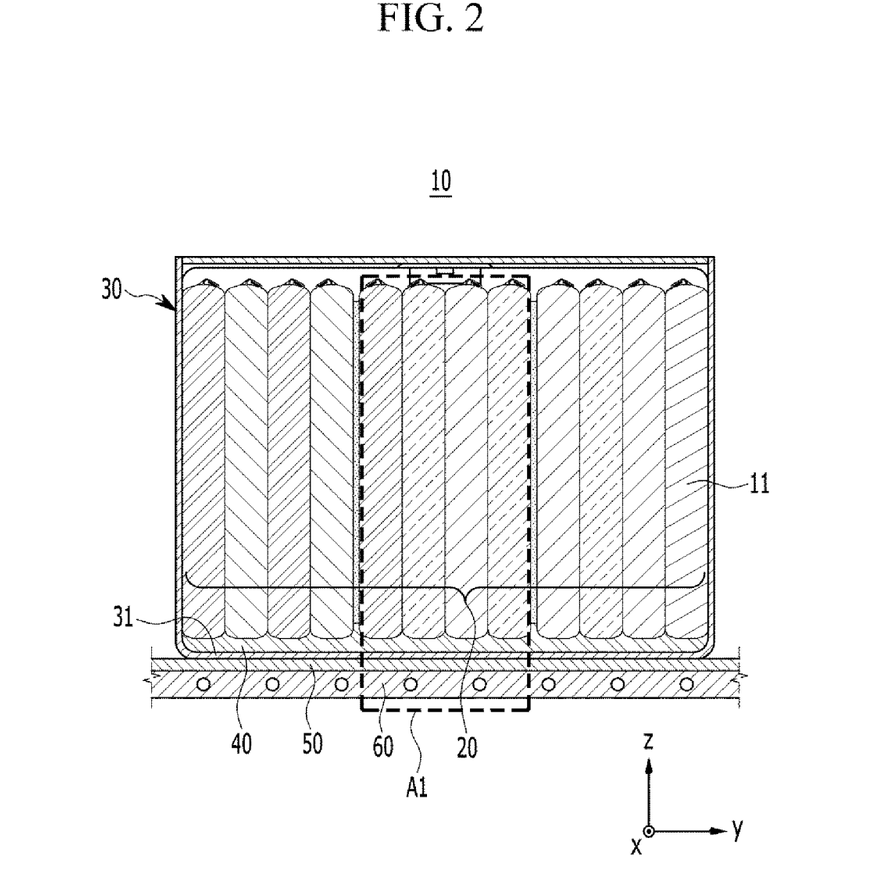
FIG. 2 is a cross-sectional view taken along the cutting line A-A' of FIG. 1.

FIG. 1 is a perspective view of a conventional battery module. FIG. 2 is a cross-sectional view taken along the cutting line A-A' of FIG. 1. In particular, FIG. 2 additionally shows a heat transfer member and a heat sink located under the battery module.

Referring to FIGS. 1 and 2, the conventional battery module 10 is configured such that a plurality of battery cells 11 are stacked to form a battery cell stack 20, and the battery cell stack 20 is housed in the module frame 30.

As described above, since the battery module 10 includes a plurality of battery cells 11, it generates a large amount of heat in the charging and discharging process. The battery module 10 may include, as a cooling means, a thermally conductive resin layer 40 located between the battery cell stack 20 and the bottom part 31 of the module frame 30. Further, when the battery module 10 is mounted on a pack frame to form a battery pack, a heat transfer member 50 and a heat sink 60 may be sequentially located under the battery module 10. The heat transfer member 50 may be a heat dissipation pad, and the heat sink 60 may have a coolant flow passage formed therein.

Figure 3:
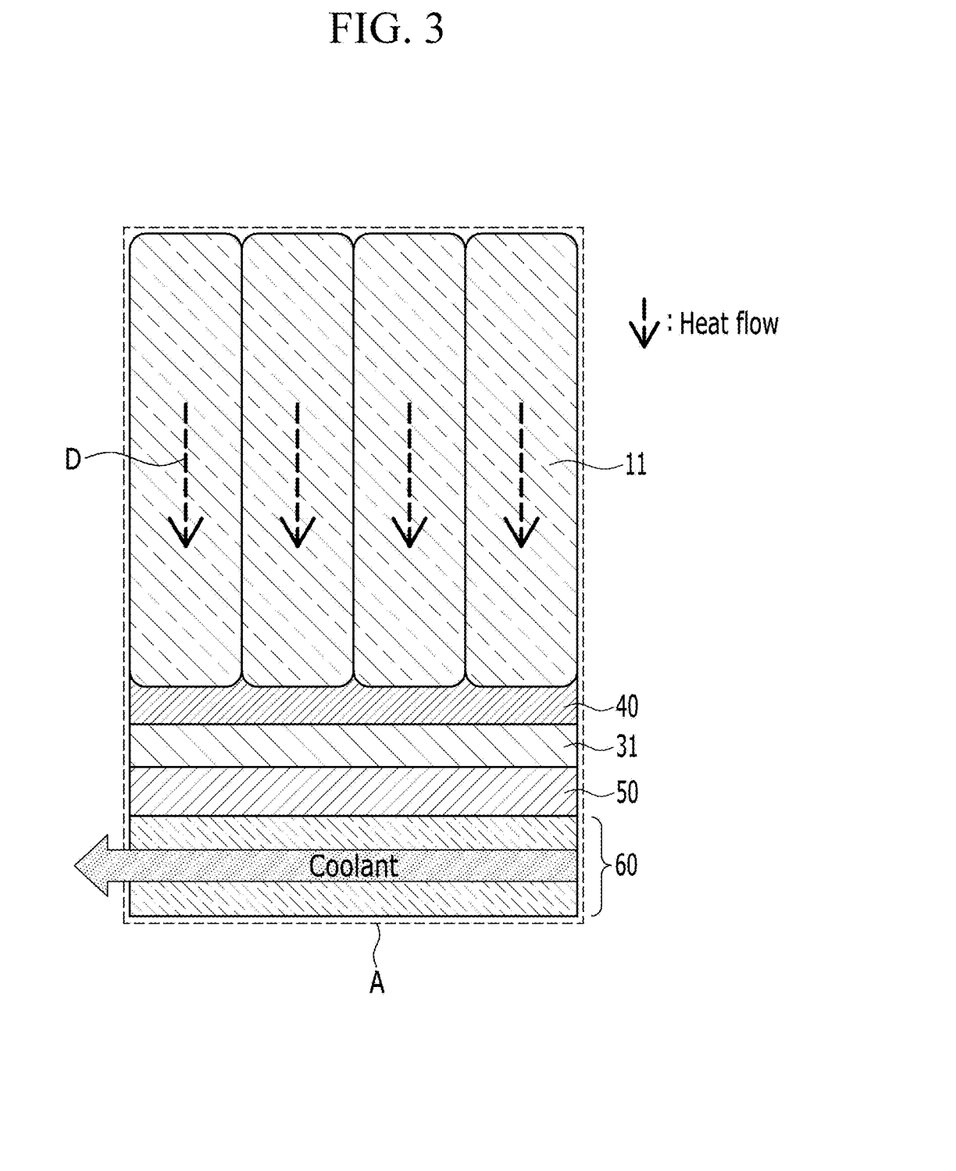
FIG. 3 is an enlarged view showing an area A1 of FIG. 2.

FIG. 3 is an enlarged view showing an area A1 of FIG. 2. Referring to FIGS. 1 to 3, heat generated from the battery cells 11 passes through a thermally conductive resin layer 40, a bottom part 31 of a module frame 30, a heat transfer member 50, and a heat sink 60 in this order along the direction D, and then is transferred to the outside of the battery module 10. However, as described above, the conventional battery module 10 has a complicated heat transfer path and thus, it is difficult to effectively transfer heat generated from the battery cells 11 to the outside. In particular, the module frame 30 itself can reduce the heat conducting characteristics, and a fine air layer such as an air gap that may be formed between the module frame 30, the heat transfer member 50, and the heat sink 60 may also reduce heat conducting characteristics.

Therefore, in response to the trend that demands for increasing the capacity for a battery module is continuing, it is practically necessary to develop a battery module that can satisfy these various requirements together while improving cooling performance.

DETAILED DESCRIPTION OF THE INVENTION

Technical Problem

It is an object of the present disclosure to provide a battery module with a simplified cooling structure and improved cooling performance, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising: a battery cell stack in which a plurality of battery cells are stacked; a module frame for housing the battery cell stack; and a first heat sink located at the upper part of the module frame, wherein the first heat sink comprises an upper plate and a lower plate, wherein a lower plate of the first heat sink constitutes an upper cover of the module frame, and wherein the first heat sink forms a cooling flow passage as at least one partition wall is formed between the upper plate and the upper cover of the module frame.

Heat generated in the battery cell stack may be transferred in a first direction, with the first direction corresponding to each direction toward the first heat sink with reference to the center of the battery cell.

A coolant flowing through the cooling flow passage of the first heat sink may make contact with the upper cover of the module frame.

The partition wall may be protruded from the upper plate in a direction opposite to a direction toward the upper part of the module frame.

The partition wall may be extended from the upper plate to an upper part of the module frame.

The partition wall may have a thickness narrower than the width of the cooling flow passage.

The first cooling flow passage may have the same width, and an injection port and a discharge port of the first cooling flow passage may be located on the same side of the upper part of the module frame.

The first heat sink includes a first protrusion and a second protrusion that are located separately from each other on one side of the upper plate, and an auxiliary plate extending from end parts of the first protrusion and the second protrusion toward the module frame may be located at the lower part of the first protrusion and the second protrusion.

A first through part penetrating toward the upper plate is located on an auxiliary plate located at the lower part of the first protrusion, and a second through part penetrating toward the upper plate may be located on an auxiliary plate located at the lower part of the second protrusion.

One of the first through part and the second through part is an inflow port for injecting a coolant into the inside of the first heat sink, and the other one may be a discharge port for discharging the coolant from the inside of the first heat sink.

At least one of the inflow port and the discharge port may include a sealing member that wraps the outer periphery thereof.

A thermally conductive resin layer is formed between the lower part of the module frame and the battery cell stack, a heat transfer member and a second heat sink are sequentially formed in the lower part of the module frame, and a coolant flow passage is formed in the inside of the second heat sink.

Heat generated in the battery cell stack may be transferred in a second direction, with the second direction corresponding to each direction toward the second heat sink with reference to the center of the battery cell, and heat transferred in the first direction may be greater than heat transferred in the second direction.

In addition, a battery module can be provided in which the heat transfer member is a heat dissipation pad.

According to another embodiment of the present disclosure, there can be provided a battery pack including the above-mentioned battery module.

Advantageous Effects

According to the embodiments of the present disclosure, a battery module that improves the cooling performance while simplifying a cooling structure can be provided due to a structure in which a module frame and a heat sink are integrated.

In addition, the heat transfer path through which heat generated from the battery cells is transferred to the outside is simplified, thereby increasing the cooling efficiency of the battery module.

The effects of the present disclosure are not limited to the effects mentioned above and additional other effects not described above will be clearly understood from the description of the appended claims by those skilled in the art.

Detailed Description of the Embodiments

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, areas, etc. are exaggerated for clarity. In the figures, for convenience of description, the thicknesses of some layers and areas are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

In the following, the battery pack for a secondary battery according to an embodiment of the present disclosure will be described. However, the description herein is made based on the front surface of the front and rear surfaces of the battery pack, but is not necessarily limited thereto, and even in the case of the rear surface, the same or similar contents may be described.

In the following, the battery module according to an embodiment of the present disclosure will be described.

However, the description herein is made based on the front surface of the front and rear surfaces of the battery module, without being limited thereto, and even in the case of the rear surface, the same or similar contents may be described.

Figure 4:
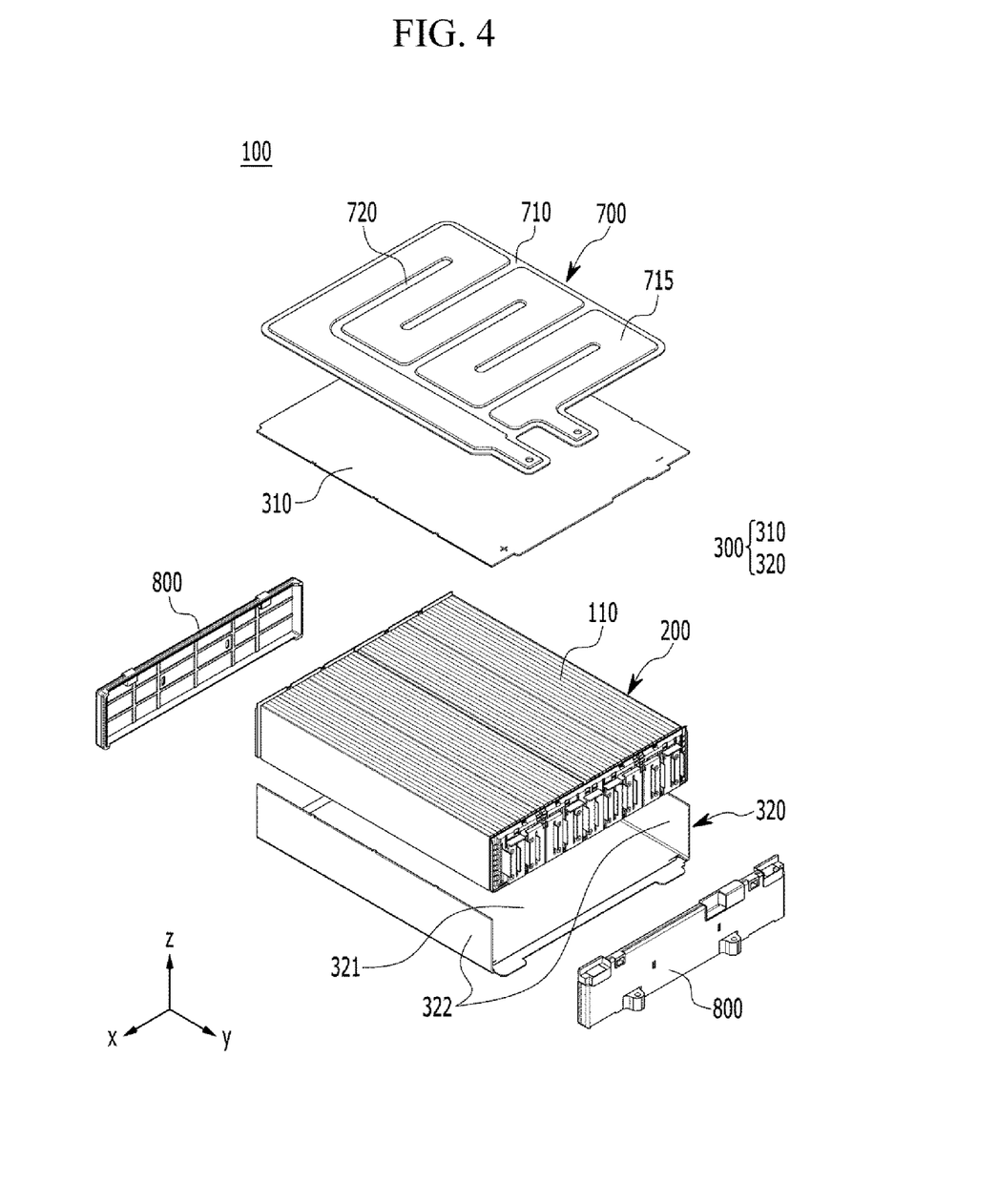
FIG. 4 is an exploded perspective view showing a battery module according to an embodiment of the present disclosure.
Figure 5:
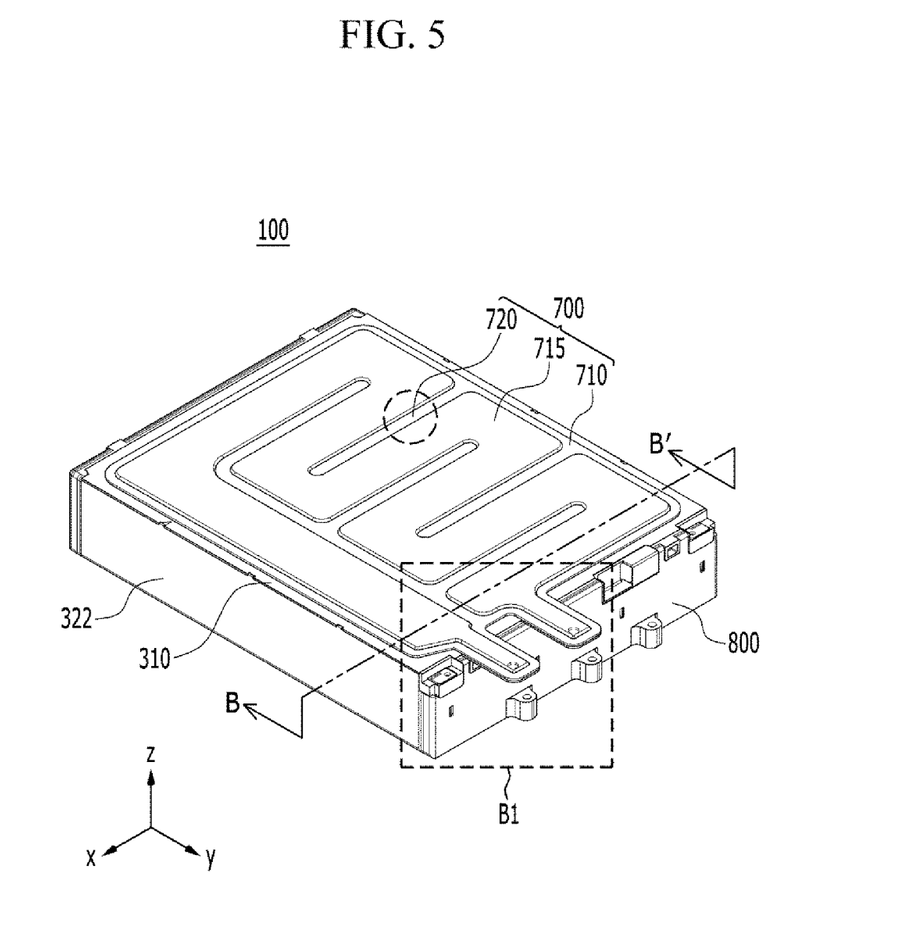
FIG. 5 is a perspective view showing a state in which components constituting the battery module of FIG. 4 are coupled together.

FIG. 4 is an exploded perspective view showing a battery module according to an embodiment of the present disclosure. FIG. 5 is a perspective view showing a state in which components constituting the battery module of FIG. 4 are coupled together.

Referring to FIGS. 4 and 5, the battery module 100 according to an embodiment of the present disclosure includes a battery cell stack 200 in which a plurality of battery cells 110 are stacked, a module frame 300 in which the battery cell stack 200 is disposed, a first heat sink 700 located at the upper part of the module frame 300, and end plates 800 that cover the front and rear surfaces of the battery cell stack 200.

As an example, the module frame 300 includes a U-shaped frame of which an upper surface, a front surface and a rear surface are opened, and an upper plate 400 that covers the upper part of the battery cell stack 120. The U-shaped frame 320 includes a bottom part 321 located in the direction in which the battery cell stack 200 is inserted, and side parts 322 that wrap both side surfaces of the battery cell stack 200 at both sides of the bottom part 321. However, the module frame 300 is not limited thereto, and can be replaced with a frame having another shape such as a mono frame surrounding the battery cell stack 200, except for the L-shaped frame or the front and rear surfaces.

The first heat sink 700 according to the present embodiment includes an upper plate 710 on which a recessed part 715 is formed, and a lower plate 310 coupled to the upper plate 710. In this case, the lower plate 310 of the first heat sink 700 may constitute the upper cover 310 of the module frame 300. In the following, the lower plate 310 of the first heat sink 700 and the upper cover 310 of the module frame 300 will be described as the same configuration.

As the first heat sink 700 forms at least one partition wall 720 between the upper plate 710 and the lower plate 310, it may form a cooling flow passage through which coolant flows. The partition wall 720 corresponds to a structure that is formed by the recessed part 715 formed in the upper plate 710, and the recessed part 715 may be formed in the upper plate 710 in a direction away from the lower plate 310.

The module frame 300 includes a U-shaped frame 320 of which an upper surface, a front surface and a rear surface are opened, and an upper cover 310 that covers the upper part of the battery cell stack 200. However, the module frame 300 is not limited thereto, and can be replaced with a frame having another shape such as a mono frame surrounding the battery cell stack 200, except for the L-shaped frame or the front and rear surfaces.

The battery cell 110 is preferably a pouch-type battery cell. The battery cell can be manufactured by housing the electrode assembly in a pouch case of a laminate sheet including a resin layer and a metal layer, and then heat-sealing the sealing part of the pouch case. Such a battery cell 110 may be composed of a plurality of cells, and the plurality of battery cells 110 form a battery cell stack 200 that is stacked so as to be electrically connected to each other. In particular, as shown in FIG. 4, a plurality of battery cells 110 may be stacked along a direction parallel to the x-axis.

However, the battery module 100 according to an embodiment of the present disclosure may be a large area module in which the battery cell stack 120 includes a relatively larger number of battery cells than the conventional battery module. In the case of a large area module, the length of the battery module in the horizontal direction becomes relatively long. Here, the length of the battery module in the horizontal direction may mean the length in the direction in which the battery cells are stacked. Therefore, when the battery module 100 corresponds to a large area module, as the number of battery cells 100 contained in the battery cell stack 200 increases, the heat generated may also increase. To this end, the battery module 100 needs to be more improved in the cooling performance.

The first heat sink 700 included in the battery module 100 according to the present embodiment is located at the upper part of the module frame 300. As the upper cover 310 of the module frame 300 constitutes the lower plate of the first heat sink 700, the coolant flowing through the cooling flow passage of the first heat sink 700 may make contact with the upper cover 310 of the module frame 300. Thereby, heat generated in the battery cell 110 is rapidly cooled by the coolant in contact with the upper part of the module frame 300 and thus, the cooling efficiency can be improved. In addition, unlike the conventional battery module 10, unnecessary cooling structures can be eliminated and thus, the height of the battery module 100 is reduced, thereby reducing costs and increasing space utilization.

In particular, when a sealing part (not shown) of the battery cell 110 is located at the upper end part of the battery cell stack 200, there is a possibility that flames or the like may be discharged from the sealing part. Thereby, heat generation may be relatively severe at the upper end part of the battery cell stack 200. However, according to the present embodiment, as the first heat sink 700 is disposed adjacent to the upper end part of the battery cell stack 200, the cooling efficiency can be further increased The first heat sink 700 may be connected to at least a partial area of the upper cover 310 of the module frame 300 through a process such as heat fusion or welding. In particular, the upper plate 710 of the first heat sink 700 may be directly coupled to the area in contact with the upper cover 310 of the module frame 300 through a process such as thermal welding or welding. Accordingly, the coolant flowing through the recessed part 715 formed in the inside of the first heat sink 700 can flow without leaking to the outside.

The recessed part 715 formed in the first heat sink 700 is a part in which the upper plate 710 is formed so as to be protruded upward, and the recessed part 715 may form a meandering cooling flow passage in the upper plate 710. Therefore, a partition wall 720 may be formed between the adjacent recessed parts 715. The recessed part 715 may be a U-shaped tube having a cross-section cut in the yz plane perpendicular to the direction in which the coolant flows, and the upper cover 310 of the module frame 300 may be located at the opened lower side of the U-shaped tube.

As the first heat sink 700 is formed with at least one partition wall 720 between the upper plate 710 and the upper cover 310 of the module frame, a cooling flow passage corresponding to the recessed part 715 may be formed. Here, the partition wall 720 may have a shape protruding from the upper plate 710 toward the upper cover 310 of the module frame 300. The partition wall 720 may be directly coupled to the upper cover 310 of the module frame 300. In particular, one area of the partition wall 720 that is directly coupled to the upper cover 310 of the module frame 300 can be connected to at least a partial area of the upper cover 310 of the module frame 300 through a process such as heat fusion or welding. Accordingly, the coolant may flow through a cooling flow passage formed along the partition wall 720 in the inside of the first heat sink 700.

Further, the partition wall 720 may have a thickness narrower than the width of the recessed part 715. In order to expand the recessed part 715, which is a space in which a cooling flow passage is formed, to the maximum, the partition wall 720 may have a thickness minimized enough to be directly coupled to the upper cover 310 of the module frame 300. Accordingly, the amount of the coolant contained in the first heat sink 700 can be maximized and thus, the cooling efficiency for heat generated from the battery cells 110 can be improved.

It is more preferable that the recessed part 715 has a shape in which the cooling flow passage is bent several times in the first heat sink 700 in order to reduce the temperature deviation between the widths of the coolant flow passages.

Hereinafter, the configuration of the first heat sink 700 according to an embodiment of the present disclosure will be described in more detail.

Figure 6:
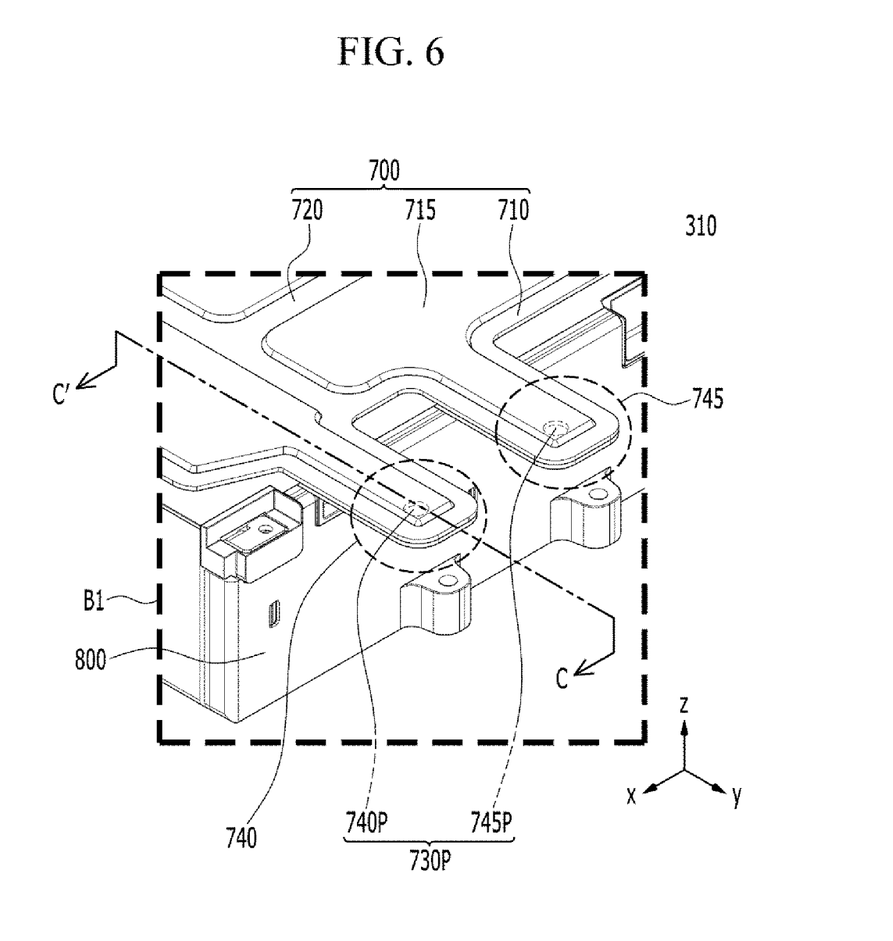
FIG. 6 is an enlarged view showing an area B1 of FIG. 5.
Figure 7:
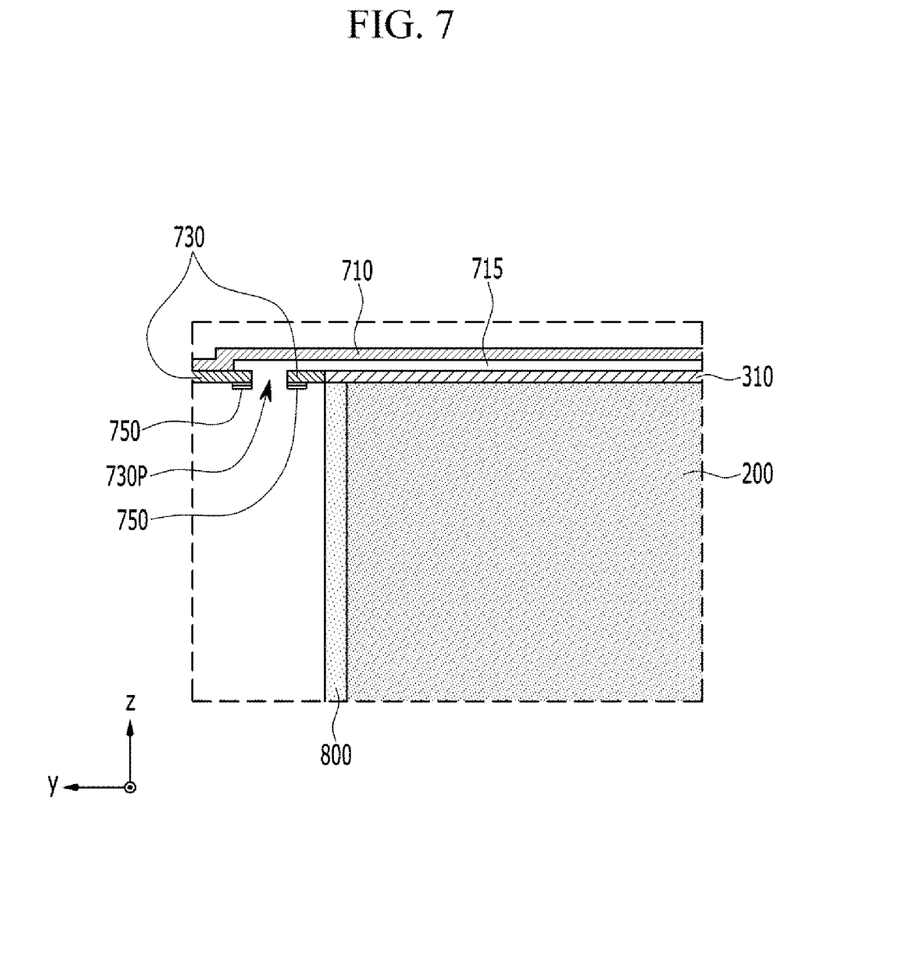
FIG. 7 is a cross-sectional view taken along the cutting line C-C' of FIG. 6.

FIG. 6 is an enlarged view showing an area B1 of FIG. 5. FIG. 7 is a cross-sectional view taken along the cutting line C-C' of FIG. 6.

Referring to FIGS. 6 and 7, a first heat sink 700 contained in the battery module 100 according to an embodiment of the present disclosure may include not only an upper plate 710, a partition wall 720 formed to be extended from the upper plate 710, and a recessed part 715 partitioned by the partition wall 720, but also a first protrusion 740 and a second protrusion 745 formed on one side of the first heat sink 700. In particular, the first protrusion 740 and the second protrusion 745 may be located on one side adjacent to the upper cover 310 of the module frame 300.

The first protrusion 740 and the second protrusion 745 are the areas formed by extending the upper plate 710 and extending in the y-axis direction beyond the upper cover 310 of the module frame 300. As an example, an auxiliary plate 730 can be directly coupled to the lower part of each of the first protrusion 740 and the second protrusion 745 through a process such as heat fusion or welding.

The auxiliary plate 730 may include a through part 730P in at least a partial area. The through part 730P is an area that is passed through the auxiliary plate 730 so as to face the upper plate 710. That is, the through part 730P may be a hole that allows a partial region of the recessed part 715 to be opened. The through part 730P may include a first through part 740P and a second through part 745P. A first through part 740P is formed in the first protrusion 740, and a second through part may be formed in the second through part 745P. The through part 740P may be an inflow port that supplies the coolant from the outside to the inside of the first heat sink 700 or a discharge port for allowing the coolant flowing inside the first heat sink 700 to be discharged to the outside of the first heat sink 700. As an example, when the first through part 740P formed in the first protrusion 740 is an inflow port, the second through part 745P formed in the second protrusion 745 may be a discharge portion, and vice versa.

Further, as shown in FIG. 7, the through part 730P may include a sealing member 750 surrounding the outer periphery thereof. As the sealing member 750 is formed on the outer periphery of the through part 730P, leakage of the coolant at the time of inflow and discharge of the coolant can be prevented. Further, the structure of the sealing member 750 according to the present embodiment is not limited, but a gasket-shaped member or a valve port member may be applied.

In addition, the through part 730P can be connected to a separate cooling port (not shown) through which coolant is supplied and discharged to the heat sink. Here, the cooling port (not shown) may include a coolant injection port and a coolant discharge port. As an example, when the first through part 740P is an inflow port, the coolant injection port is connected, and when the second through part 745P is a discharge port, a coolant discharge port may be connected.

Figure 8:
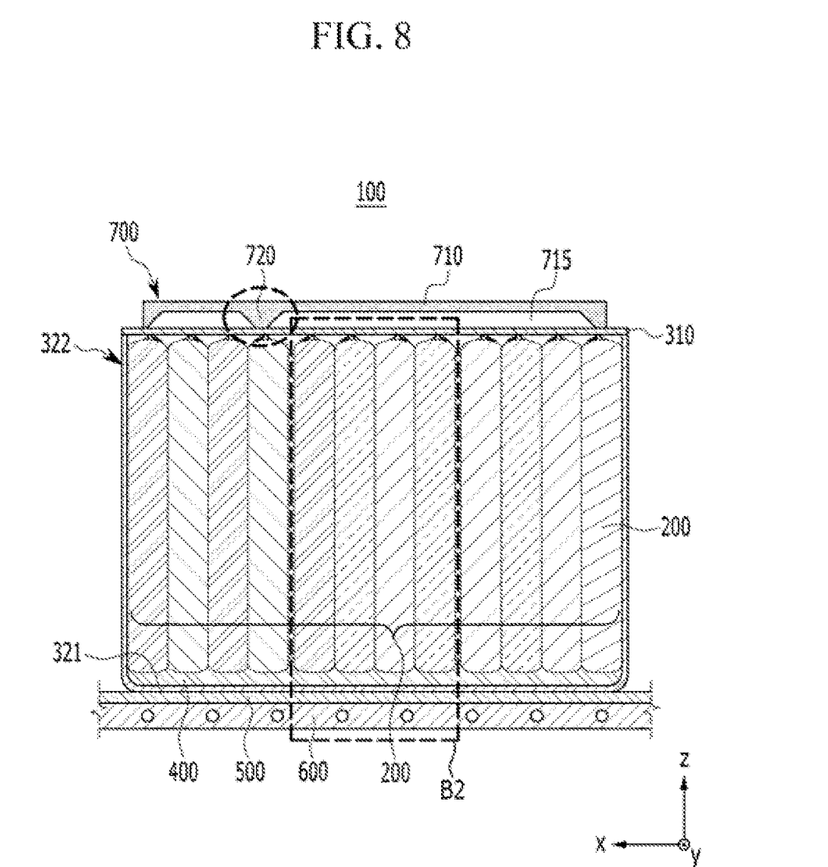
FIG. 8 is a cross-sectional view of a battery module according to another embodiment of the present disclosure, taken along the cutting line B-B' of FIG. 5.
Figure 9:
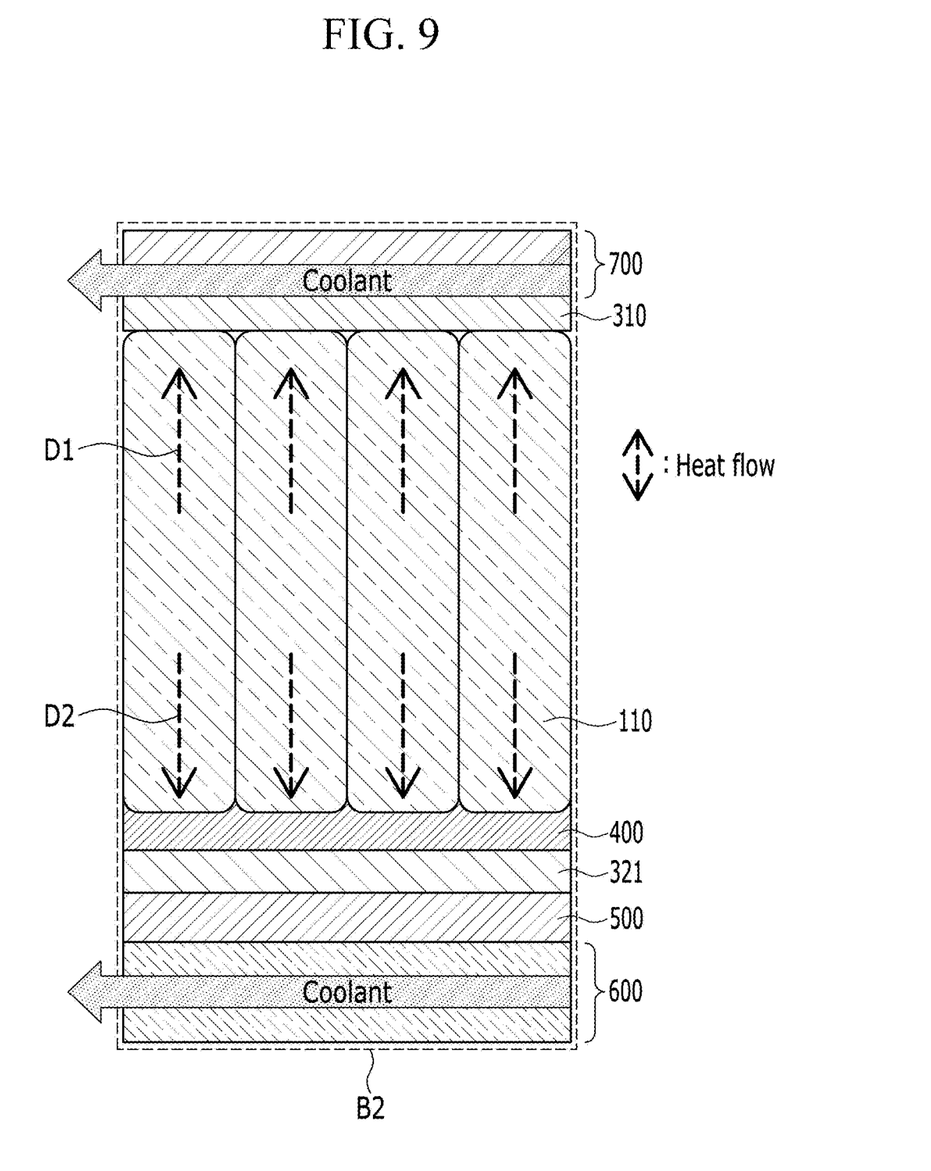
FIG. 9 is an enlarged view showing an area B2 of FIG. 8.

FIG. 8 is a cross-sectional view of a battery module according to another embodiment of the present disclosure, taken along the cutting line B-B' of FIG. 5. FIG. 9 is an enlarged view showing an area B2 of FIG. 8. In particular, the battery module 100 according to the embodiment of FIGS. 8 and 9 may further include a heat transfer member 500 and a second heat sink 600 located under the battery module 100.

As described above, since the battery module 100 includes a plurality of battery cells 110, a large amount of heat is generated in the charging and discharging process. In particular, in order to form a large-area module, by mounting a battery cell stack including more battery cells in one battery module compared to the existing battery module, the battery module 100 can generate a greater amount of heat compared to the conventional battery module 10. The battery module 100 may include, as a cooling means, a first heat sink 700 located on the upper part 310 of the module frame 300.

Referring to FIGS. 8 and 9, heat generated from the battery cell 110 passes through the upper part 310 of the module frame 300 and the coolant included in the first heat sink 700 in this order along the first direction D1, and can be transferred to the outside of the battery module 100. Here, the first direction D1 may be a direction corresponding to a direction toward the first heat sink 700 with reference to the center of the battery cell 110. Therefore, a conventional unnecessary cooling structure is eliminated, the heat transfer path is simplified, and an air gap between layers may be reduced, so that cooling efficiency or performance can be increased. In particular, when compared to the conventional heat sink 60 of FIGS. 1 and 2, the coolant contained in the first heat sink 700 makes contact with the upper part 310 of the module frame 300, thereby capable of performing more direct cooling.

Further, the lower part 310 of the module frame 300 is required to have a separate layer for fixing the battery cell stack or securing the insulation performance, whereas the upper part 310 of the module frame 300 is in direct contact with the upper part of the battery cell stack 200. Therefore, when the first heat sink 700 is located on the upper part 310 of the module frame 300 rather than the first heat sink 700 is located on the lower part 321 of the module frame 300, it may be more effective in carrying out direct cooling with the coolant.

According to another embodiment of the present disclosure, the battery module 100 may include, as an auxiliary cooling means together with the first heat sink 700, a thermally conductive resin layer 400 located between the battery cell stack 200 and the bottom part 321 of the module frame 300. Further, when the battery module 100 is mounted on the pack frame to form a battery pack, a heat transfer member 500 and a heat sink 600 may be sequentially located under the battery module 100. The heat transfer member 500 may be a heat dissipation pad, and a coolant flow passage may be formed in the heat sink 600.

Accordingly, in the battery module 100, heat generated from the battery cells 110 is mainly transferred in the first direction D1 toward the first heat sink 700, directly cooled, and supplementarily transferred in the second direction (D2) and cooled through the second heat sink 600, so that the cooling performance can be further improved and the problem of heat generation can be controlled in detail. In addition, as heat generated from the battery cell 110 is dispersed and cooled in the first direction (D1) and the second direction (D2), the temperature deviation of the battery cell stack 200 may be reduced compared to the conventional one.

The one or more battery modules according to the present embodiment described above can be mounted together with various control and protection systems such as a battery management system (BMS) and a cooling system to form a battery pack.

The above-mentioned battery module or the battery pack can be applied to various devices. These devices may be applied to transportation means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
120: battery cell stack
130: busbar frame
140: protective frame
200: module frame

The invention claimed is:

1. A battery module comprising:
   a battery cell stack in which a plurality of battery cells are stacked;
   a module frame housing the battery cell stack;
   a first heat sink located at an upper part of the module frame; and
   a thermally conductive resin layer formed between a lower part of the module frame and the battery cell stack,
   wherein the first heat sink comprises an upper plate and a lower plate,
   wherein the lower plate of the first heat sink constitutes an upper cover of the module frame,
   wherein the first heat sink includes a cooling flow passage having at least one partition wall formed between the upper plate and the upper cover of the module frame, and
   wherein the upper part of the module frame is in direct contact with an upper part of the battery cell stack.

2. The battery module according to claim 1, wherein the battery module is configured to transfer heat generated in the battery cell stack in a first direction, the first direction being a direction extending from a vertical center of each of the plurality of battery cells toward the first heat sink.

3. The battery module according to claim 1, wherein the cooling flow passage is configured to receive a coolant flowing therethrough, such that the coolant contacts the upper cover of the module frame.

4. The battery module according to claim 1, wherein the at least one partition wall protrudes from the upper plate in a direction toward the upper cover of the module frame.

5. The battery module according to claim 4, wherein the at least one partition wall extends from the upper plate to the upper cover of the module frame.

6. The battery module according to claim 1, wherein the at least one partition wall has a thickness narrower than a width of the cooling flow passage.

7. The battery module according to claim 1, wherein the cooling flow passage has an injection port and a discharge port located on a same end of the upper part of the module frame.

8. The battery module according to claim 1, wherein the first heat sink comprises a first protrusion and a second protrusion that are located separately from each other on a same end of the upper plate, and an auxiliary plate extending from end parts of the first protrusion and the second protrusion toward the module frame, the auxiliary plate being located at a lower part of the first protrusion and the second protrusion.

9. The battery module according to claim 8, wherein the auxiliary plate has a first through part penetrating toward the upper plate and located at the lower part of the first protrusion, and a second through part penetrating toward the upper plate and located at the lower part of the second protrusion.

10. The battery module according to claim 9, wherein the first through part is an inflow port configured to receive injection of a coolant therethrough into an inside of the first heat sink, and the second through part is a discharge port configured to receive discharge of the coolant therethrough from the inside of the first heat sink.

11. The battery module according to claim 10, wherein at least one of the inflow port and the discharge port comprises a sealing member that wraps an outer periphery thereof.

12. The battery module according to claim 2, further comprising:
   a heat transfer member and a second heat sink sequentially disposed in the lower part of the module frame,
   wherein a coolant flow passage is included in an inside of the second heat sink.

13. The battery module according to claim 12, wherein the battery module is configured to transfer the heat generated in the battery cell stack in the first direction and in a second direction, the second direction being a direction extending from the vertical center of each of the plurality of battery cells toward the second heat sink, and an amount of the heat transferred in the first direction is greater than an amount of the heat transferred in the second direction.

14. A battery pack comprising the battery module according to claim 1.

15. A battery module comprising:
   a battery cell stack in which a plurality of battery cells are stacked;
   a module frame housing the battery cell stack; and
   a first heat sink located at an upper part of the module frame;
   a thermally conductive resin layer formed between a lower part of the module frame and the battery cell stack; and
   a heat transfer member and a second heat sink sequentially disposed in the lower part of the module frame,
   wherein the first heat sink comprises an upper plate and a lower plate,
   wherein the lower plate of the first heat sink constitutes an upper cover of the module frame,
   wherein the first heat sink includes a cooling flow passage having at least one partition wall formed between the upper plate and the upper cover of the module frame, and wherein the battery module is configured to transfer heat generated in the battery cell stack in first and second directions, the first and second directions being directions extending from a vertical center of each of the plurality of battery cells toward the first and second heat sinks, respectively, and an amount of the heat transferred in the first direction is greater than an amount of the heat transferred in the second direction.

* * * * *